(12) United States Patent
Kildegaard

(10) Patent No.: US 7,883,316 B2
(45) Date of Patent: Feb. 8, 2011

(54) MONITORING THE OPERATION OF A WIND ENERGY PLANT

(75) Inventor: Casper Kildegaard, Kolding (DK)

(73) Assignee: LM Glasfiber A/S, Lunderskov (DK)

( * ) Notice: Subject to any disclaimer, the term of this patent is extended or adjusted under 35 U.S.C. 154(b) by 508 days.

(21) Appl. No.: 10/586,090

(22) PCT Filed: Jan. 6, 2005

(86) PCT No.: PCT/DK2005/000001

§ 371 (c)(1),
(2), (4) Date: Oct. 18, 2006

(87) PCT Pub. No.: WO2005/068834

PCT Pub. Date: Jul. 28, 2005

(65) Prior Publication Data

US 2007/0297892 A1   Dec. 27, 2007

(30) Foreign Application Priority Data

Jan. 16, 2004   (DK) ............................... 2004 00053

(51) Int. Cl.
*F03D 11/00* (2006.01)

(52) U.S. Cl. ............................................ 416/1; 416/61
(58) Field of Classification Search .................... 416/1, 416/61, 146 R, 241 R
See application file for complete search history.

(56) References Cited

U.S. PATENT DOCUMENTS

| 4,297,076 | A  | * | 10/1981 | Donham et al. ............. 416/37 |
| 6,619,918 | B1 | * | 9/2003  | Rebsdorf ..................... 416/1 |
| 6,940,185 | B2 | * | 9/2005  | Andersen et al. ............ 290/44 |
| 2003/0006615 | A1 | * | 1/2003 | Roberts et al. ............... 290/55 |

* cited by examiner

*Primary Examiner*—Edward Look
*Assistant Examiner*—Sean J Younger
(74) *Attorney, Agent, or Firm*—Day Pitney LLP

(57) ABSTRACT

The invention relates to a method of monitoring the operation of a wind energy plant, wherein the operation comprises collection of blade-related operational data. Novel aspects of the method according to the invention comprises that, in predefined points on the blade, position indicators are arranged that can be used in a positioning system for identifying the position of the position indicators; and that the positions of the position indicators and hence the position of the predefined points are determined and collected as a part of said blade-related operational data.

14 Claims, 3 Drawing Sheets

MONITORING THE OPERATION OF A WIND ENERGY PLANT

The invention relates to a method of monitoring the operation of a wind energy plant, wherein the monitoring comprises collection of blade-related operational data. The invention further relates to a system for monitoring the operation of a wind energy plant, wherein the monitoring comprises collection of blade-related operational data. The invention also relates to a blade for a wind energy plant, wherein the blade is adapted to monitor the operation of the wind energy plant, wherein the monitoring comprises collection of blade-related operational data.

To optimize the operation of a wind energy plant, both with respect to maximization of the energy supplied, anticipation of defects, if any, and prolongation of the longevity of the wind energy plant, the wind energy plant is monitored by collection of operational data. Operational data may comprise oscillations in the blades, stress strain in the blades, wind speed, wind direction, blade pitch angle, speed of rotation of blades, etc. The wind energy plant comprises measurement units for measuring properties for the wind energy plant during operation, and based on those properties said operational data can subsequently be deduced.

Now follows exemplary measurement units for measuring properties in the blade that can be used for determining stresses in the blade by determination of stress strains in the blade.

Strain gauges are mounted on the blade in order to thereby enable monitoring of the magnitude of the stress strains occurring on the relevant location. Such strain gauges are, by means of wires, connected to electric measurement equipment that is able to process the measured data. However, strain gauges are associated with the drawback that they are exhausted and decompose in the event of stress strains of a given magnitude and/or in case of a given number of movements.

A further known kind of measurement units for determining stress strain is taught in WO 99/57435, in which an expression of stress strains, viz vibrations in a blade for a wind energy plant, is measured by means of one or more accelerometers that are arranged in the blade interior. Such accelerometers gauge vibrations in the blade, and in case of vibrations in excess of a predefined magnitude, the wind energy plant can be stopped, or a regulation of the blade setting can be performed.

This kind of measurement of deformation or flexing does not always suffice, it being impossible to sufficiently accurately distinguish between the measured vibrations since a part of them originates in oscillations in the blade as such and in the tower of the wind energy plant. Since it is desired to monitor the blade during operation, it is necessary to be able to measure the current stress in the blade in the form of precise measurements of stress strains and deformation.

WO 03/029750 teaches a method of measuring flexing in eg a blade for a wind energy plant. That method is mechanically very simple and consists of a bar-shaped element attached to the blade interior at the one end. In case of flexing of the blade, the free end of said bar-shaped element is moved. That movement is measured and translated into a given value for the flexing of the blade. That method of measuring the flexing of the blade, however, is sensitive to differences in temperature or differences in thermal-expansion coefficients between rod-shaped element and blade.

It is thus an object of the invention to provide a method of collecting operational data, by which the operation of the wind energy plant can be further improved. Simultaneously it is an object to provide a method of determining strains in a blade, by which the above-referenced problems are solved.

The novel aspect of a method according to the invention consists in that, in at least one predefined point on the blade, a position indicator is arranged that can be used in a positioning system for identifying the position of the position indicator; and that the position of the position indicator and hence the position of the predefined point is determined and collected as a part of said blade-related operational data. By identification of the position of specific well-known points on a blade during operation and collection of these positions, further parameters are available that can be used for monitoring and optimising the operation of the wind energy plant.

According to one embodiment the position of the at least one initially defined point is used in a control- and regulation-algorithm for controlling the wind energy plant. By using the positions in a control- and regulation-algorithm one acquires more profound knowledge of the operation and hence it is possible to use eg such algorithms that take into account a number of operation factors and hence control the wind energy plant in a way that improves the power supplied by the wind energy plant.

According to a specific embodiment the position of the at least one predefined point is used to determine material stresses in the blade by determining the flexing of the blade, wherein said method comprises the following steps:

comparison of the collected position of the predefined point to a predefined reference position of that point;

based on the comparison of the collected position to the reference position, determination of the flexing and hence the material stress on the basis of deviations between the collected position and the reference position.

Reference positions can be a set of data that describe the expected individual positions of the points. Alternatively they can be data that describe the expected relative mutual position of the points.

The collected positions can be used to determine the flexing, including the deformations of the blade. In case the positions are used in this manner, a durable system without movable parts is accomplished that is able to quite accurately determine flexing and deformation of the blade, wherein measurements are performed wirelessly in relation to one or more reference points.

Moreover it is hereby enabled to regulate the setting of the individual blade in relation to the prevailing operation conditions. Today's blades with lengths in excess of 50 meters, and tomorrow's blades with lengths as long as 75 meters or even beyond 100 meters, give rise to an increasing need for being able to perform individual regulations of the blade setting, as there may be large differences in the stress imposed on a blade during a rotor revolution. For instance, there will typically be a higher wind speed in the uppermost part of the rotor plane than is the case in the lowermost part. Moreover the rotor plane can be affected heterogeneously by gusts of wind. Individual regulation of eg the pitch angle of the blades enables maintenance of the stress of the rotor on eg the main shaft on a regular level and with an even load.

According to one embodiment the at least one predefined reference position is/are determined and collected positions of the predefined point, when the wind energy plant operates in a situation which is viewed as being a reference situation. For instance, a reference situation for operation of the wind energy plant could be a situation in which specific wind conditions prevail, corresponding to what can be regarded as an average wind, and it is possible to collect reference positions in these conditions. One alternative is to make the blades rotate on the wind energy plant when there is wind calm and the load on the blades is minimal.

According to one embodiment the positioning system comprises one or more reference points, wherein the positions of the reference points are known, and wherein the position of the at least one point on the blade defined in advance is determined by use of the distance from the reference points to the position indicator arranged in the predefined point(s). Use of distances makes it easy to calculate the positions of the points. Distance measurement becomes increasingly used and may be based on eg IR light or on radio signals, where the propagation times of the IR light or the radio signals are used to determine a distance between the reference points and the position indicators. For instance, the reference points may be a GPS satellite.

In one embodiment the determination of the position of the at least one point on the blade defined in advance further comprises use of the position of the wind energy plant. Depending on the desired accuracy of the determination of position, it is possible to minimize the number of GPS satellites used and instead to combine the measured satellite distances with knowledge on the position of the wind energy plant and hence the path of movement which is physically possible to the point. Hereby the amount of distance measurements to be performed between the reference points and the position indicators is minimised, and hence the position can be determined more quickly, while simultaneously the power consumption of the reference point and the position indicator is reduced.

Moreover the system concerns a system for monitoring the operation of a wind energy plant, wherein the system comprises means for collecting blade-related operational data. The novel aspect of the system is that, in at least one predefined point on the blade, a position indicator is arranged, wherein the position indicator can be used in a positioning system for identifying the position of the position indicator, and means of collecting blade-related operational data comprises means for collecting the position of the position indicator and hence the position of the predefined point.

According to an embodiment the system comprises one or more reference points, wherein the positions of the reference points are known, and wherein the position of the at least one point on the blade defined in advance is determined by use of the distance from the reference points to the position indicator arranged in the point defined in advance.

According to a particular embodiment the positioning system GPS (Global Positioning System) is used, wherein the position indicators are a GPS receiver. By using this already known positioning system, the system can comparatively easily be configured by arrangement of GPS receivers in the predefined points on the blade, wherein the GPS receivers are modified to determine their positions and transmit them to a computer located eg in the wind energy plant.

Moreover the invention relates to a blade of a wind energy plant, wherein the blade enables monitoring of the operation of a wind energy plant, wherein the monitoring comprises collection of blade-related operational data. The novel aspect of the blade is that, in at least one predefined point on the blade, a position indicator is arranged that can be used in a positioning system for identifying the position of the position indicator; and that the position of the position indicator and hence the position of the predefined point is determined and collected as a part of said blade-related operational data.

According to one embodiment the positioning system is GPS and the position indicators are GPS receivers.

The invention will now be described in further detail with reference to figures that exemplify embodiments of the invention:

Figure 1A:
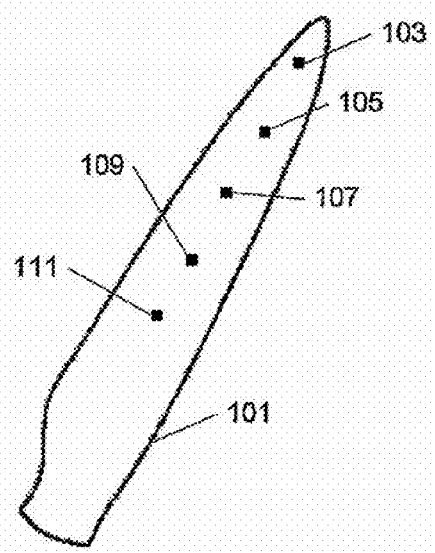
FIG. 1A shows a blade for a wind energy plant, wherein—in predefined points—means are arranged for identifying the position of the points.

FIG. 1A shows a blade 101 for a wind energy plant adapted for monitoring the operation according to the invention. On the blade 101 and in predetermined positions, position indicators 103, 105, 107, 109 and 111 are arranged that can be used in a position detecting system for identifying their positions and hence the positions of the predefined points. The position indicators can be eg a GPS receiver or the like, as will be described in further detail in the context of FIGS. 3 and 4.

Identification of the position of specific well-known points on a blade in operation and collection of such position provide a further parameter that can be used to optimise the operation of the wind energy plant. With knowledge of the positions of the points in operation and based on changes in their relative mutual positions, it is possible to determine the flexing of the blade. Moreover, it is possible to very accurately determine the speed of a blade in one of the well-known points.

The number of points where the position is to be identified will depend on which operational property it is desired to monitor and optionally optimize. Moreover choice of the mutual locations of the points also has a bearing on which operational property it is desired to monitor and optimize.

Figure 1B:
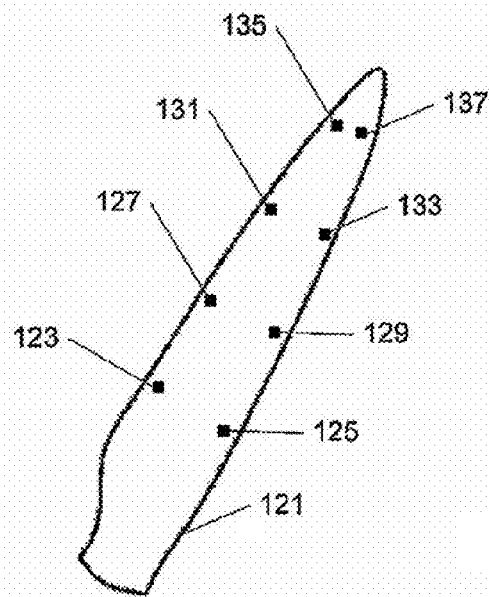
FIG. 1B shows an alternative embodiment of a blade for a wind energy plant.

FIG. 1B shows an alternative embodiment of a blade for a wind energy plant; here points 121, 123, 125, 127, 129, 131, 133, 135, 137 is arranged along the edges on the blade. This positioning is optimised in particular for determining torsional twists of the blade.

Figure 2:
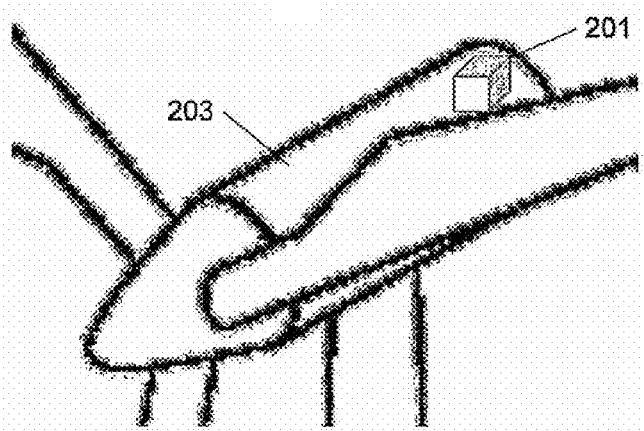
FIG. 2 shows a computer arranged in the housing of a wind energy plant.

FIG. 2 shows a computer 201 arranged in the housing of a wind energy plant 203. The computer 201 is used to collect operational data via connections to miscellaneous transducers arranged on the wind energy plant Moreover the computer can be equipped with software for optimising the operation of the wind energy plant by use of the collected data for controlling the wind energy pant, including pitching the blades, turning the head of the wind energy plant, etc. In the present invention the computer is able to receive and collect information on the positions of the individual position indicators. For instance, this information can be received via a wireless communication connection to the individual position indicators or from other parts of the positioning system.

Figure 3:
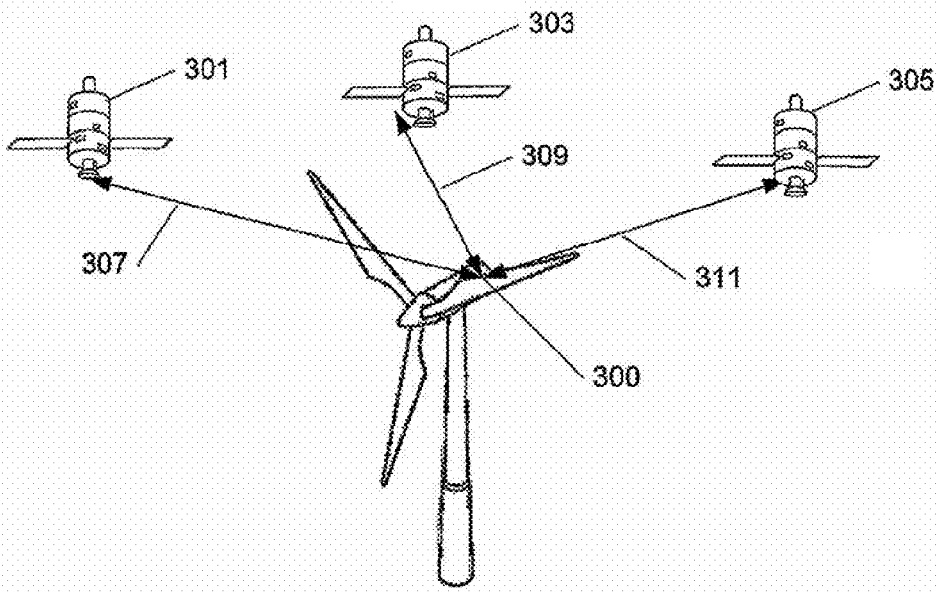
FIG. 3 shows a system for monitoring the operation of a wind energy plant, wherein the monitoring comprises collection of the position of predefined points on the blade.

FIG. 3 shows a system for monitoring the operation of a wind energy plant, wherein the monitoring comprises collection of the position of predefined points on the blade. The position of the position indicators identified in a positioning system is based on GPS where the position indicators are GPS receivers that use reference points in the form of GPS satellites 301, 303, 305 to determine their position. In the Figure, the position determination is illustrated by a point 300 on the blade, wherein a GPS receiver is arranged in said point. The distance 307, 309, 311 between the receiver in the point 300 and the satellites 301, 303, 305 is determined, and based on these distances 307, 309, 311 the position of the point can be calculated by use of triangulation. According to one embodiment the units can be standard GPS receivers and may either perform the calculation of position themselves or, alternatively, the GPS receivers can be further simplified in that they transmit the measured distances on to the computer 201 in the wind energy plant which then performs the calculation. This may be advantageous in order to minimize the power consumption of the GPS receiver.

The calculation of position, which is known in GPS, is based in principle on delimitation of the points that have the measured distance to the individual GPS satellites. Thus, if only one GPS satellite is concerned, points with the measured distance are limited to points in a sphere around the GPS satellite. If two GPS satellites 301 and 303 are combined, two spheres result and the points that simultaneously have the measured distances to both of the two GPS satellites are restricted to the intersection of the two spheres in the form of the points on a circle. If one further GPS satellite 305 is used, the points are restricted to being an intersection of three spheres which is two points. In order to be entirely sure which of the two points is the right one, a fourth satellite can be used; alternatively, knowing the geographical location of the wind energy plant, one could exclude the one point, following which the position of the GPS receiver is found. Depending on the desired accuracy of the determination of position, it is possible to minimize the number of used GPS satellites and instead combine the measured satellite distances with knowledge on the position of the wind energy plant and thus the physically possible movement path of the point. Hereby the number of distance measurements to be performed between the GPS satellites and the GPS receiver is minimised, and hence the position can be established more quickly while simultaneously the power consumption of the GPS receiver is reduced.

The distances between the individual GPS satellites and GPS receivers are determined by the GPS satellites transmitting radio signals at a given wavelength and dispatch time. These transmitted signals are received by the GPS receivers and, knowing the dispatch time and speed of the radio signal, it is possible to determine the distance.

The accuracy of the determination of distance can be further enhanced by positioning a reference GPS receiver in a known position, and the measurement of the position of the reference GPS base station in combination with the measurement described above can be used to take into account uncertainty and hence yields a very precise measurement. The reference GPS receiver can optionally be arranged in the base of the tower of the wind energy plant in order to ensure a reference point which is constant in relation to the blades.

A GPS receiver that could be used as identification means could be based on a GPS receiver Paradigm processor from TOPCON which is used in Topcon's GPS+ receivers. These processors have low power consumption and are also quick when it comes to determination of position.

Figure 4:
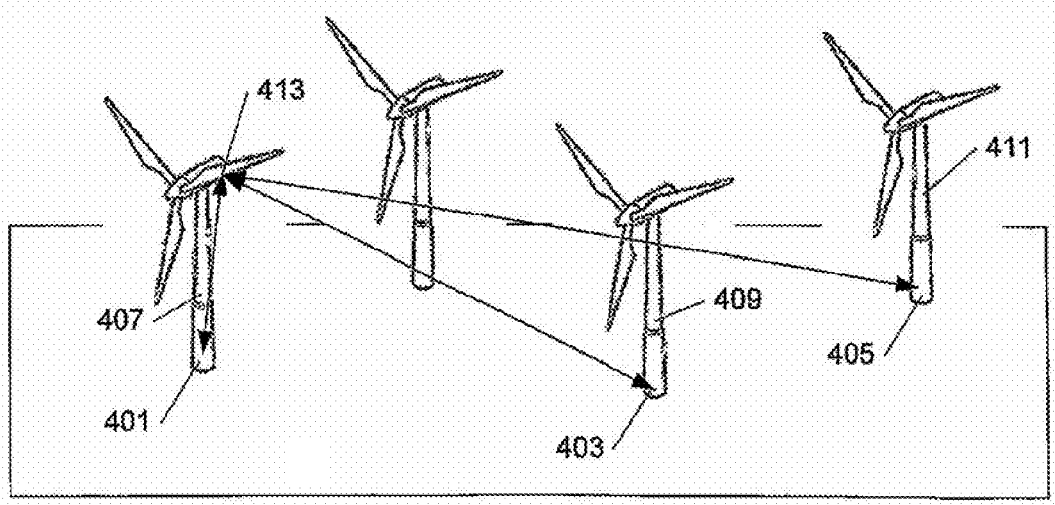
FIG. 4 shows an alternative embodiment of a system for monitoring the operation of a wind energy plant, wherein the monitoring comprises collection of the position of predefined points on the blade.

FIG. 4 shows a further embodiment of a system for monitoring the operation of a wind energy plant 407, wherein monitoring comprises collection of the position of points on the blades that are defined in advance.

Here a positioning system is employed that works in accordance with the same principle as GPS; it being, however, based on local measurements. Instead of using GPS satellites as reference points and measuring the distances thereto, some reference points are arranged in the form of transmitters in fixed positions 401, 403, 405 in and/or around the wind energy plant 407. In FIG. 4 three transmitters are arranged, wherein the one transmitter is arranged in a position 401 in the wind energy pant 407, and wherein two other transmitters are arranged in positions 403 and 405 in other wind energy plants 409, 411 situated around them.

The distance to the point 413 in which a receiver is arranged can be determined by transmitting radio signals from the transmitters to the receiver. The transmitted signals are received by the receiver, and knowing the dispatch time (eg comprised in the radio signal), the speed of the radio signal, and the position of the transmitter, the distance can be determined.

Based on the determined distances the position of the point 413 can be determined by use of position calculations corresponding to the calculations that are performed in the GPS as described in the context of FIG. 3. Since it is possible in that version of the positioning system to use transmitters with fixed positions, it is possible to accomplish accurate detection of position.

In the description of FIG. 3 and FIG. 4 position indicators are described in the form of radio-signal receivers that are arranged in points defined in advance on the blade. To minimise the risk of lightning striking the blade, it is desired to avoid providing the receiver via a supply wire from the wind turbine housing. One option for supplying the receivers could be to use optical fibres in the blade, where light is transmitted through the optical fibre, and the energy is collected at the receiver and used to supply the receiver. A further option could be to use an auto-rechargeable battery that utilizes the movement of the blade for collecting energy.

In the above, examples were given as to how the position of predefined points on a blade can be determined and collected by arranging positioning indicators that are used in a positioning system for determining the position of the position indicators which are subsequently collected by eg a computer in the wind energy plant. Now follows an example of use of the collected positions.

Figure 5:
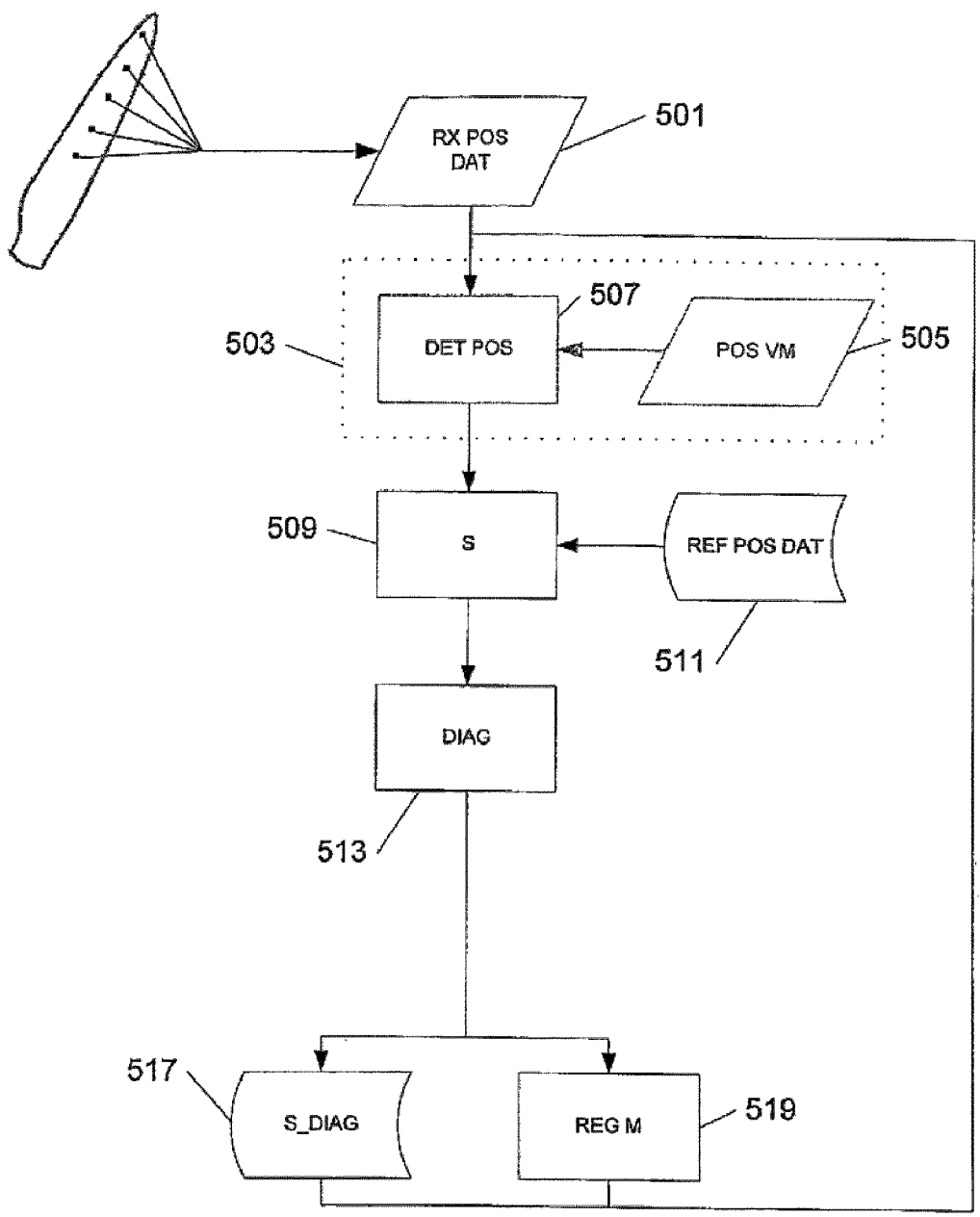
FIG. 5 is a flow chart in which the collected positions are used to determine the load on a blade based on the flexing of the blade.

FIG. 5 shows an example of use of the collected positions, where the collected positions are used to determine the load on a blade based on the flexing of the blade. If, for instance, it is the computer in the wind energy plant that is used to collect information, it could also be the one which is provided with software that implements an algorithm for finding occurrences of flexing based on the collected positions. One example of such algorithm is illustrated in FIG. 5, where 501 indicates the data that were collected from the positioning system. These data can either be positions dispatched from the positioning system either from the receivers arranged on the blade or from the radio-signal transmitter. Or, alternatively, data could also be the distances measured between transmitters and receivers based on which of the positions are calculated in accordance with the principle of triangulation calculation described above. In case the number of transmitters does not enable locating a position of the predefined points, but rather a group of positions, a position is selected in 503. This takes place in that, in 507, a comparison is performed in 507 of the possible positions 501, knowing of the position 505 of the wind energy plant which could be stored in a computer in the wind energy plant. Then the positions of the points defined in advance are determined, and in 509 a comparison 509 of the determined positions of the points to their predefined reference positions is performed, and based on the difference a diagnosis is made, in 513, concerning the flexing of the blade is based on knowledge of the blade configuration and the blade material. Finally, the measured diagnosis is stored in 517 with a view to monitoring, and in 519 the diagnosis is used as input for a regulation algorithm that, depending on the flexing, is able to eg initiate pitching of the blade to minimize the flexing and hence avoid damage and/or to optimise the effect supplied by the wind energy plant.

It will be understood that the invention as disclosed in the present description and figures can be modified or changed, while continuing to be comprised by the scope of protection conferred by the following claims.

The invention claimed is:

1. A method of monitoring the operation of a wind energy plant, wherein the monitoring comprises:
    collection of blade-related operational data, characterized in that,
    one or more position indicators are arranged at a corresponding one or more predefined points on the blade for directly identifying, by a triangulating positioning system using triangulation, the position of each of the individual one or more position indicators; and
    the position of the one or more predefined points on the blade are directly determined and collected from the position of the corresponding one or more position indicators as a part of said blade-related operational data;
    whereby blade flexing and/or loading is determined.

2. A method according to claim 1, wherein the position of the one or more predefined points is used in a control- and regulation-algorithm for controlling the wind energy plant.

3. A method according to claim 1, wherein the position of the one or more predefined points is used for determining material stresses in the blade by determining the flexing of the blade, wherein the method comprises the following steps:
    comparison of each collected position of each predefined point to a predefined reference position of that point;
    based on the comparison of each collected position to each predefined reference position, determination of the flexing and hence the material stress on the basis of deviations between each collected position and the each predefined reference position.

4. A method according to claim 3, wherein the one or more predefined reference positions are determined and collected positions of the one or more predefined points when the wind energy plant is in operation in a situation which is viewed as being a reference situation.

5. A method according to claim 1, wherein the positioning system comprises one or more reference points wherein the positions of the one or more reference points are known, and wherein the positions of the corresponding one or more predefined points on the blade are determined by use of the distance from the one or more reference points to the corresponding one or more position indicators.

6. A method according to claim 5, where determination of the position of the one or more predefined points on the blade further comprises use of the position of the wind energy plant.

7. A system for monitoring the operation of a wind energy plant, wherein the system comprises:
    a triangulating positioning system;
    means for collecting blade-related operational data, characterised in that one or more position indicators are arranged at a corresponding one or more predefined points on the blade for directly identifying, by said triangulating positioning system using triangulation, the position of each of the individual one or more position indicators, and
    said means for collecting blade-related operational data comprises means for collecting the position of the one or more position indicators and directly determining therefrom the position of the corresponding one or more predefined points on the blade;
    whereby blade flexing and/or loading is determined.

8. A system according to claim 7, wherein the system comprises one or more reference points, wherein the positions of the one or more reference points are known, and wherein the positions of the corresponding one or more predefined points on the blade are determined by use of the distance from the one or more reference points to the one or more position indicators arranged in the corresponding one or more predefined points.

9. A system according to claim 7, wherein the positioning system is GPS, and wherein the position indicators are GPS receivers.

10. A blade for a wind energy plant, wherein the blade enables monitoring of the operation of a wind energy plant, wherein the monitoring comprises:
    collection of blade-related operational data, characterised in that,
    one or more position indicators are arranged at a corresponding one or more predefined points on the blade for directly identifying, by a triangulating positioning system using triangulation, the position of each of the individual one or more position indicators, and
    the position of the one or more predefined points on the blade are directly determined and collected from the position of the corresponding one or more position indicators as a part of said blade-related operational data;
    whereby blade flexing and/or loading is determined.

11. A blade for a wind energy plant according to claim 10, wherein the positioning system is GPS; and wherein the position indictors are GPS receivers.

12. The method of claim 1, wherein said rotational speed is determined from said operational data.

13. The system of claim 7, wherein said rotational speed is determined from said operational data.

14. The blade of claim 10, wherein said rotational speed is determined from said operational data.

* * * * *